United States Patent [19]

Lang

[11] 4,059,177
[45] Nov. 22, 1977

[54] BAND CLUTCH ASSEMBLY

[75] Inventor: Ernest U. Lang, Niles, Mich.

[73] Assignee: National-Standard Company, Niles, Mich.

[21] Appl. No.: 697,020

[22] Filed: June 17, 1976

[51] Int. Cl.² ............................................. F16D 41/20
[52] U.S. Cl. .................................................. 192/41 S
[58] Field of Search .................. 192/41 S, 81 R, 81 C

[56] References Cited

U.S. PATENT DOCUMENTS

| 3,483,955 | 12/1969 | Schell et al. | 192/41 S |
| 3,532,197 | 10/1970 | King | 192/41 S |
| 3,557,920 | 1/1971 | Lang | 192/41 S |

Primary Examiner—Allan D. Herrmann
Attorney, Agent, or Firm—Johnson, Dienner, Emrich & Wagner

[57] ABSTRACT

A clutch band having a wide portion and a narrow portion for use in an overrunning band clutch assembly includes at least one projection portion extending outwardly from the band contacting the outer member of the clutch assembly during overrun to prevent premature wearing of the narrow portion of the clutch band in the inner member of the clutch assembly.

4 Claims, 3 Drawing Figures

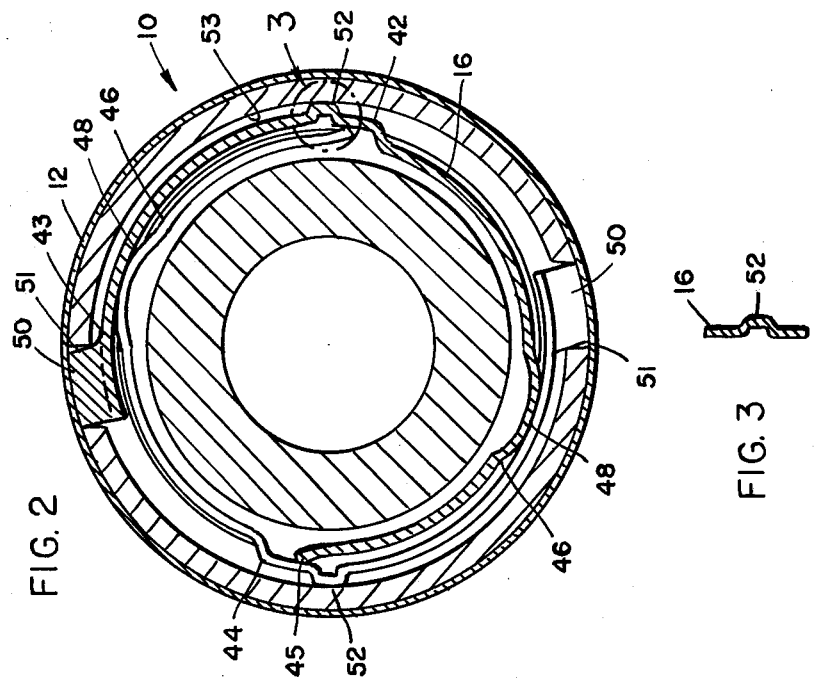
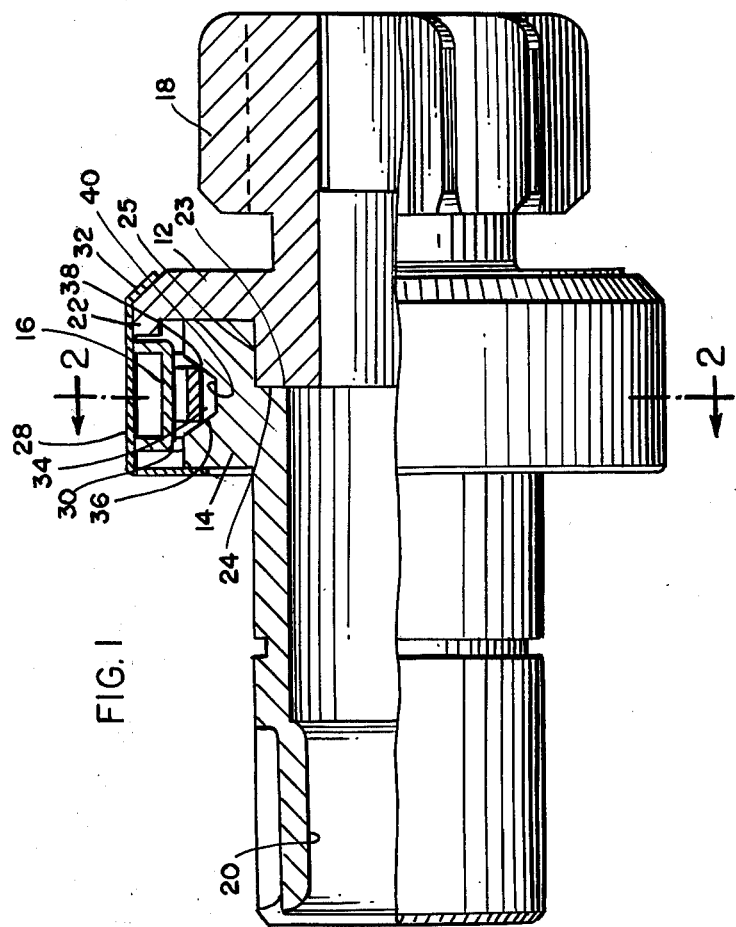

BAND CLUTCH ASSEMBLY

BACKGROUND OF THE INVENTION

The clutch band of the present invention relates to the class of band clutch constructions and configurations as disclosed in U.S. Pat. No. 2,518,453, issued Aug. 15, 1950 to J. M. Dodwell and particularly in U.S. Pat. No. 3,731,773, issued May 8, 1973 to M. Austin and N. Boulton. The above identified patents disclose a band-type, free wheeling clutch embodying drive and driven clutch members, one of the members being provided with a V-groove into which the narrowed end of at least one clutch band is positioned. The wide end of at least one clutch band is anchored to the other of the clutch members such that upon rotation of the drive member in one direction, the driven member is driven in the same direction through the engagement of the side edges of the narrow end of at least one clutch band with the side walls of the V-groove. When the driven member rotates at a faster speed than the drive member, at least one clutch band permits the driven member to overrun the drive member.

In the development of band-type, free-wheeling clutch assemblies of the above type, one of the major problems was in providing an adequate anchor at one end of the clutch band. Various structural arrangements have been proposed wherein the clutch band is formed as an elongated structure having a wider, heavier end portion to provide an adequate anchor to engage one of the clutch members and a narrower, lighter end portion extending into the V-groove of the other clutch member. In the operation of the overrunning type clutch assemblies containing at least one band, during the overrunning condition, the wider portion, being heavier, flies radially outwardly with more force than the narrow portion, being lighter, such that the wider portion pulls the narrower portion into the V-groove of the inner member thus prematurely wearing out the narrower portion of the band. Such premature wear has severely reduced the number of clutching cycles obtainable with such clutch assemblies.

SUMMARY OF THE INVENTION

It is one object of the present invention, to provide a clutch band construction for use in an overrunning band clutch assembly having limited radially outward movement thereby eliminating failures due to premature wearing of the clutch band because of excessive contact pressure with the inner member of the clutch assembly during overrun.

It is another object of the present invention to provide a band clutch construction of the overrunning type having projection means thereon to prevent premature wearing of the clutch band with the sidewalls of the groove of the inner member.

In one embodiment of the present invention an overrunning clutch assembly includes a driven clutch member coaxially disposed with respect to a drive clutch member and a clutch engaging member for transmitting a torque between the drive and driven clutch member when the drive member is rotated in one direction. The drive clutch member is formed with a circumferentially extending groove and the driven clutch member includes an anchor supporting structure to engage the anchor of the clutch band. The clutch band for use in the overrunning clutch assembly has a wide portion anchored to the anchoring supporting structure of the driven clutch member, a narrow portion directed into the groove and a spring section in the form of a bulge provided intermediate its ends. Positioned intermediate the ends of the clutch band substantially near where the wide portion meets the narrow portion is a projection portion extending outwardly from the clutch band to contact the outer member. The projection portion prevents the wide portion of the clutch band from an outwardly movement when the clutch assembly is in the overrunning condition thereby substantially eliminating the premature wearing of the narrow end of the band clutch in the groove.

DESCRIPTION OF THE DRAWINGS

FIG. 1 is a vertical partial sectional view of an overrunning type clutch showing one embodiment of the clutch band assembly construction in accordance with the present invention;

FIG. 2 is a sectional view taken along the line 2—2 of FIG. 1 showing the clutch band assembly in the overrunning condition; and FIG. 3 is a sectional view of the band only along line 3—3 of FIG. 2 showing a cross section of the projection of the present invention.

DETAILED DESCRIPTION

In FIGS. 1 and 2 there is shown an overrunning band clutch assembly 10 having a drive clutch member 14 and a driven clutch member 12 and a plurality of overlapping torque transmitting clutch bands, generally designated by the reference numeral 16. The drive clutch member 14 is illustrated as having a spline 20 to interconnect with a splined shaft (not shown) driving the clutch assembly and the driven clutch member 12 includes a pinion 18 adapted to a mating gear (not shown). The inner end of the drive clutch member 14 is aligned coaxially with driven clutch member 12 by an annular pilot 25 of the driven clutch member 12. A thrust surface 24 of drive clutch member 14 engages the thrust surface 23 of driven clutch member 12 and both members are retained in position by collar 28 which encloses the clutch assembly between the radially inwardly extending flanges 30 and 32.

As is conventional in band clutches of the overrunning type, the drive clutch member 14 is formed with a radially extending groove 34 defined by opposite side walls 36 and 38, tapered inwardly towards each other, and by a bottom wall 40. The drive clutch member 14 is generally constructed of a hardened steel or similar type material to withstand the wedging action of the clutch band assembly 16 with the groove. In the embodiment illustrated in FIGS. 1 and 2, the clutch band assembly 16 includes two identical clutch bands 42 and 44 which are shown in interfitting overlapping relation. The clutch bands 42 and 44 include a wider end portion 43 and a narrow end portion 45, and spring section 46 in the form of bulge 48 provided intermediate the ends of the band. The clutch bands 42 and 44 each include also a U-shaped anchor portion 50 integrally formed with the clutch bands at the terminus of the wider end portion 43. The anchor portion 50 is fitted into an anchor pocket 51 in the annular flange 22 of the driven clutch member 12. Each of the clutch bands 42 and 44 is preferably made of a spring steel stock that is shaped to the desired curvature, heat treated and set as a one-piece structure.

The wider end portion 43 of bands 42 and 44 is greater in width than the distance between the side walls 36 and 38 of the groove 34 to limit the radially inward movement when clutching. Spring section 46 in the form of bulge 48, is formed along the narrower end portion 45. A projection 52 located substantially where the wider and narrower portions of the clutch band meet extends outwardly and contacts the annular flange 22 of the driven clutch member 12 to prevent the outward movement of the clutch band and premature wear of the band in the groove.

Referring now to FIG. 2, clutch bands 42 and 44 are shown in the overrun, or also substantially at the very start of the driving condition. In clutching, as the torque is increasingly applied to the clutch member, the engaging surface of the overlying band pushes inwardly against the bulge of the other band to produce a compounding action between the bands and drive member 14. In overrun, because the projection 52 on the clutch bands 42 and 44 contacts the inner surface 53 of the annular flange 22, the clutch bands are prevented from moving radially outwardly at these points. Such restricted movement prohibits the narrow end portion 45 from being pulled into the groove and prematurely wearing the narrow end portion.

Without projection 52 on the clutch band, in the overrunning condition, the wider end portion 43, being heavier, would move outwardly against the inner surface 53 of the annular flange 22 and the narrower end portion 45 would be pulled harder into the groove of the drive clutch member 14 thus prematurely wearing the narrow portion. Accordingly, the projection 52 restricts the outward or centrifugal movement of the wider end portion 43 thereby decreasing the inward force of the narrower end portion 45 on the groove 34 and preventing the premature wearing of the narrow end in contact with the side walls 36 and 38 of the groove 34.

In the embodiment of the present invention, the anchor portion 50 of the clutch bands 42 and 44 contacts the collar 28 of the band clutch assembly at anchor pocket 51. Thus, anchor portion 50 also acts to limit the outward movement of the wider end portion 43 of the clutch band assemblies 16.

It is further apparent that modification and variations may be made in the clutch band configuration and structure without departing from the scope of the present invention. For example, it is fully within the scope of this invention to contemplate the usage of a different type anchor portion which does not limit the outward movement of the wider end portion of the clutch band assemblies 16. In such a case, a second projection 52 is provided adjacent the terminus of the wider end portion 43, which projection is in contact with the inner surface of the annular flange 22 or collar 28, as desired, to limit the outward movement of the wider end portion and prevent the premature wearing of the narrow end in contact with the wide walls 36 and 38 of the groove 34.

I claim:

1. A clutch band for an overrunning band clutch assembly having an inner clutch member coaxially disposed with respect to an outer clutch member and band clutch engaging means for transmitting a torque between the inner and outer clutch members, said clutch band having an unbalanced condition tending to cause said band to shift eccentrically during overrunning of said band clutch, and restricting means associated with said clutch band for direct contact with the adjacent clutch member limiting eccentric movement of said clutch band.

2. A clutch band for an overrunning band clutch assembly having an inner clutch member coaxially disposed with respect to an outer clutch member and band clutch engaging means for transmitting a torque between the inner and outer clutch members, said clutch band having at least one projection thereon in direct contact with said outer clutch member, said at least one projection so positioned on said clutch band such that in the overrunning condition of said band clutch assembly said clutch band is restricted from flying out by centrifugal force in the direction that would increase the force between said clutch band and said inner clutch member.

3. In an overrunning band clutch assembly having an inner clutch member coaxially disposed with respect to an outer clutch member and band clutch engaging means for transmitting a torque between the inner and outer clutch members, including in combination, at least one clutch band having an unbalanced condition tending to cause said band to shift eccentrically during overrunning of the band clutch assemblies and restricting means for direct contact of said at least one clutch band with the adjacent clutch member thereby limiting eccentric movement of said at least one clutch band.

4. The overrunning band clutch assembly in accordance with claim 3 wherein said restricting means include at least one projection positioned on said at least one clutch band for direct contact with the adjacent clutch member thereby limiting eccentric movement of said at least one clutch band.

* * * * *